United States Patent Office 3,803,190
Patented Apr. 9, 1974

3,803,190
LEAD COMPOUNDS OF 4:6-DINITRORESORCINOL
George William Charles Taylor, Waltham Abbey, Essex, Arwyn Theophilus Thomas, Orpington, Kent, and Raymond James Edward Williams, London, England, assignors to Minister of Aviation in Her Majesty's Government of the United Kingdom of Great Britain and Northern Ireland, London, England
No Drawing. Filed Jan. 15, 1963, Ser. No. 252,270
Claims priority, application Great Britain, Jan. 15, 1962, 1,477/62
Int. Cl. C07f 7/24
U.S. Cl. 260—435 A                     5 Claims

ABSTRACT OF THE DISCLOSURE

The invention relates to lead compounds of 4:6-dinitroresorcinol which may be used as priming and fast delay compositions for fuses and detonators. Hitherto lead compounds of 4:6-dinitroresorcinol have had limited technical application because of the difficulty in preparing them in reproducible and free-flowing form. Furthermore, these compounds often appear to be of indefinite constitution and, because of their insoluble nature, they are precipitated in very finely divided form to give a product which cakes on drying and is of low bulk density, dusty and poor flowing.

The present invention provides a new lead compound of 4:6-dinitroresorcinol, which may be prepared in a reproducible form having a high bulk density and which is free-flowing, dust-free and very suitable for technical use in primers, fuses and detonators.

The new compound has the formula $$3[C_6H_2N_2O_6Pb]2[Pb(OH)_2]$$

corresponding to the stoichiometric proportions 3(normal lead 4:6-dinitroresorcinate)2(lead hydroxide) and is prepared by intermixing a water-soluble lead salt and an alkaline hydroxide with 4:6-dinitroresorcinol at an elevated temperature. The process is preferably carried out by the addition of a water-soluble lead salt and an alkaline hydroxide to a suspension of finely divided 4:6-dinitroresorcinol. The temperature of the reaction mixture is preferably maintained between about 70° and 100° C. The relative proportions of 4:6-dinitroresorcinol and lead salt employed should approximate to the stoichiometric requirements of the above formula. Any soluble lead salt or alkaline hydroxide may be used but lead acetate and ammonium hydroxide are preferred in order to give a product of high bulk density.

By way of example, a typical process for the manufacture of the new compound in accordance with the invention will now be described.

600 g. of finely divided 4:6-dinitroresorcinol is suspended with stirring in 35 litres of water in 50 litres stainless steel pan jacketed for steam and cold water circulation. The temperature is raised to 90° C. and then 7.25 litres of 1.5 N lead acetate solution and 7.25 litres of 1.15 N ammonium hydroxide solution are added simultaneously during 95–105 minutes. The temperature is maintained at 90° C. for a further 15 minutes, and then reduced to 35° C. by cold water circulation through the pan jacket. Stirring is then stopped and the product allowed to settle for 3 minutes before decantation of the mother liquor. It is then washed with 3 successive 20 litre portions of water with 3 minutes stirring and 3 minutes settling in each wash, and transferred to a filter where it is finally washed with 2 litres of industrial methylated spirits. Drying is effected by passage of cold air or on a hot-table at 50° C., and the product may then be passed through a 50 B.S.S. mesh sieve, leaving little or no oversize.

The yield is 1650 g. (96 percent theoretical) of a free flowing, granular product having a bulk density 1.4 g./ml. Analysis of the product gives Pb 60.9; dinitroresorcinol 34.8; carbon 12.74% (theoretical: 61.0; 35.0; 12.73%). This material is especially suitable as a fast-burning delay composition and as an ingredient of an igniting composition.

We claim:
1. A method of producing a chemical compound in which three portions of lead 4:6-dinitroresorcinate are bonded to two portions of lead hydroxide, which consists of reacting a water soluble lead salt and an alkaline hydroxide with 4:6-dinitroresorcinol; said reactants being brought together in the stoichiometric quantities required by the product.
2. A process according to claim 1 which is carried out at a temperature between 70° and 100° C.
3. A process according to claim 1 wherein the lead salt is lead acetate.
4. A process according to claim 1 wherein the alkaline hydroxide is ammonium hydroxide.
5. A lead compound of 4:6-dinitroresorcinol having a formula corresponding to the stoichiometric proportions 3(normal lead 4:6-dinitroresorcinate)2(lead hydroxide).

References Cited
UNITED STATES PATENTS
2,441,248   5/1948   Morris et al. _____ 149—25 X LELAND A. SEBASTIAN, Primary Examiner U.S. Cl. X.R.
149—24